July 19, 1960   C. BIBBO ET AL   2,945,667
FLEXIBLE SEAL FOR VALVES

Filed Dec. 8, 1955   3 Sheets-Sheet 1

INVENTORS
CARMEN BIBBO
ROWLAND E. BROWNING

BY
ATTORNEYS

July 19, 1960
C. BIBBO ET AL
2,945,667
FLEXIBLE SEAL FOR VALVES
Filed Dec. 8, 1955
3 Sheets-Sheet 2
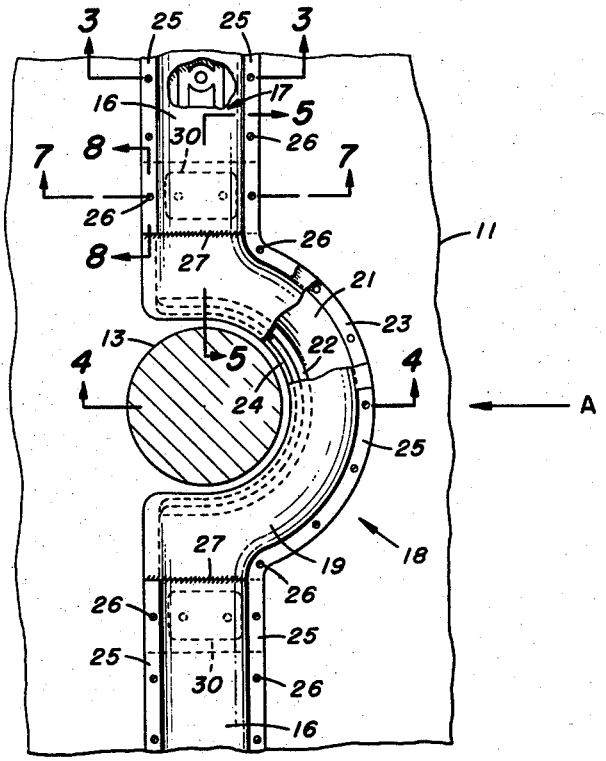
Fig. 2
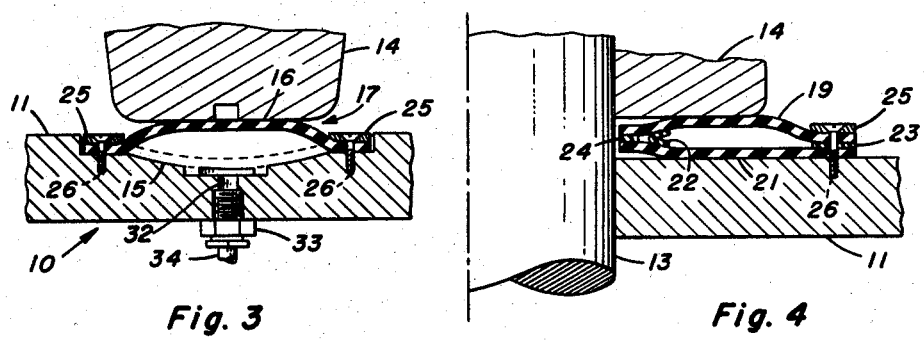
Fig. 3
Fig. 4
INVENTORS
CARMEN BIBBO
ROWLAND E. BROWNING
BY
ATTORNEYS July 19, 1960   C. BIBBO ET AL   2,945,667
FLEXIBLE SEAL FOR VALVES Filed Dec. 8, 1955   3 Sheets-Sheet 3

INVENTORS
CARMEN BIBBO
ROWLAND E. BROWNING

BY
ATTORNEYS

United States Patent Office 2,945,667
Patented July 19, 1960

2,945,667

FLEXIBLE SEAL FOR VALVES

Carmen Bibbo, Parma, Ohio, and Rowland E. Browning, Redlands, Calif., assignors, by mesne assignments, to the United States of America as represented by the Administrator of the National Aeronautics and Space Administration Filed Dec. 8, 1955, Ser. No. 551,961

1 Claim. (Cl. 251—173)

(Granted under Title 35, U.S. Code (1952), sec. 266)

The invention described herein may be manufactured and used by or for the Government of the United States of America for governmental purposes without the payment of any royalties thereon or therefor.

The present invention relates to an inflatable seal for valves. More particularly, the invention relates to a flexible inflatable seal for valves which is effective over a wide range of operating pressures. The seal of the present invention is of particular advantage for use with butterfly valves, being of continuous construction to seal in a positive manner completely around the periphery of the movable member of the valve. The seal comprises a single ply flexible strip set in a circumferential groove in the valve casing with a two ply portion of substantially U-shape part way around the shaft extensions of the movable member or vane of the valve. The seal may be inflated when the valve is closed and deflated when the valve is open. If desired negative pressure may be applied to effect a complete retraction of the seal.

An object of the present invention is to provide a new and improved inflatable seal for valves wherein leakage is prevented.

A further object is to provide a new and improved inflatable seal for valves wherein the seal may be retracted into a groove in the casing of the valve by the application of negative pressure to the seal thus to maintain a maximum flow of fluid through the valve when the valve is open.

A still further object is to provide a new and improved inflatable seal for valves which is readily removable without dismantling the components of the valve.

Another object is to provide a new and improved inflatable seal for a valve wherein a cooling fluid may be circulated through the inflating chamber when fluids having high heat pass through the valve thus to prevent damage to the seal from such heat.

Other objects and many of the attendant advantages of this invention will be readily appreciated as the same becomes better understood by reference to the following detailed description when considered in connection with the accompanying drawings wherein:

Fig. 2 is an elevation of a portion of the seal adjacent the shaft of the movable vane of the valve;

Fig. 3 is a sectional view taken along the line 3—3 of Fig. 2;

Fig. 4 is a sectional view taken along the line 4—4 of Fig. 2;

Figure 1:
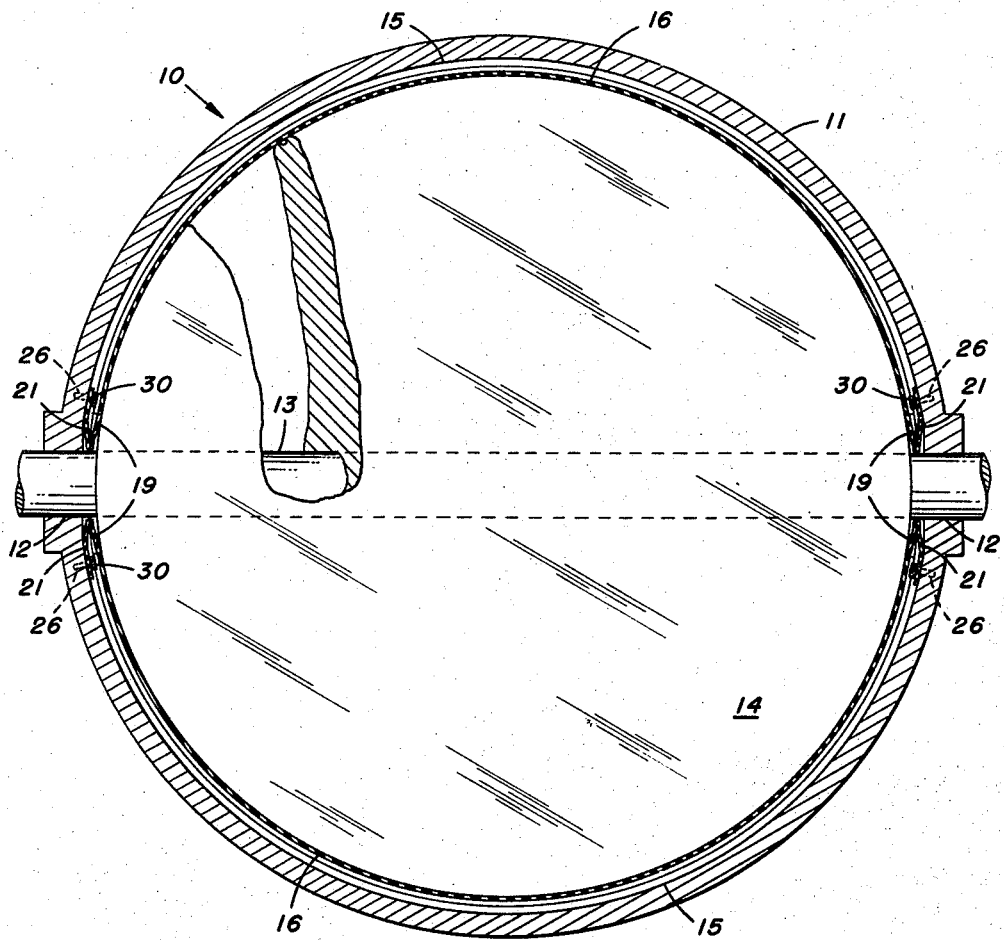
Fig. 1 is a sectional view taken through the valve and the seal.

Referring more particularly to the drawings wherein like numerals indicate like parts throughout the several views, 10 indicates generally a butterfly valve having a substantially cylindrical casing 11. Casing 11 is provided with a pair of oppositely disposed bores 12 to accommodate the shaft 13 of the movable vane or closure 14 of the valve 10. Grooves 15 formed around the inner wall of casing 11 are discontinuous adjacent the bores 12. Mounted within each groove 15 is a single ply of flexible rubberlike sheet material 16 forming a portion of a seal indicated generally at 17, and which extends approximately halfway around the inner surface of casing 11 and aligned with the periphery of vane 14 when the vane is in the closed position thereof.

The seal 17 is provided with substantially U-shaped portions indicated generally at 18 of rubberlike material and which permit the seal to pass around shaft 13. Each portion 18 comprises an inside ply 19, an outside ply 21, and a reinforcing ply 22 which is substantially V-shaped in cross section and is vulcanized to plies 19 and 21 interiorly along one side thereof and adjacent shaft 13. The edges of plies 19 and 21 are vulcanized to strips 23 and 24 mounted therebetween.

The plies 16 are fastened in grooves 15 in fluid tight relation with casing 11 by keeper strips 25 and a plurality of spaced screws 26. Strips 25 and screws 26 are mounted along plies 16 adjacent the side edges thereof. If desired one of the strips 25 and screws 26 may be extended around the outer edge of U-shaped portion 19 to firmly secure the outer edge thereof to the casing 11. Strips 25 may be formed of a plurality of pieces in order to facilitate installation and removal thereof.

Figure 5:
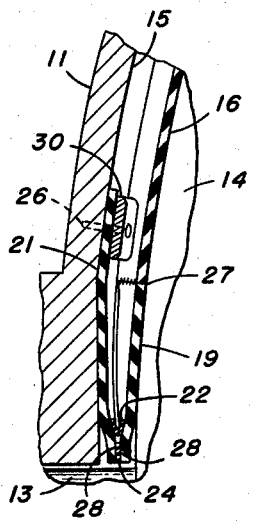
Fig. 5 is a sectional view taken along the line 5—5 of Fig. 2.

Ply 16 is butt joined by vulcanizing as shown at 27 to inside ply 19 to form a smooth surface for engagement with vane 14. The vulcanized joining of plies 19 and 21 to strip 24 is shown at 28 and to strip 23 at 29. As best shown in Fig. 5 ply 16 overlaps ply 21 of the portion 18 for a considerable distance, joint 27 being spaced from the end of ply 21. The end of ply 21 is secured to casing 11 by a clamp bar 30 and screws 31 extending thereacross, the screws being threaded into casing 11.

Figure 6:
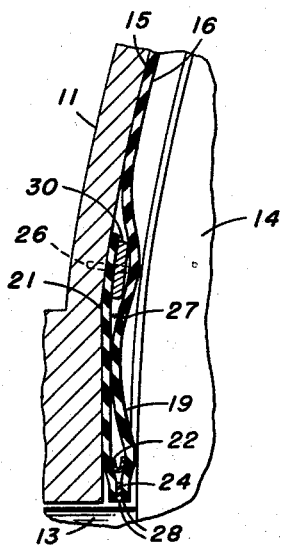
Fig. 6 is a sectional view similar to Fig. 5 and showing the seal deflated.
Figure 8:
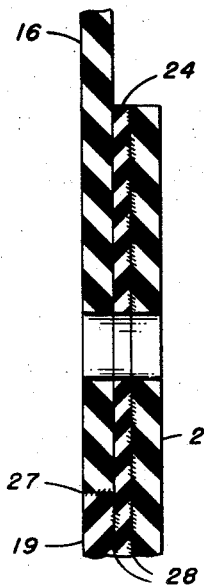
Fig. 8 is a sectional view taken along the line 8—8 of Fig. 2.
Figure 7:
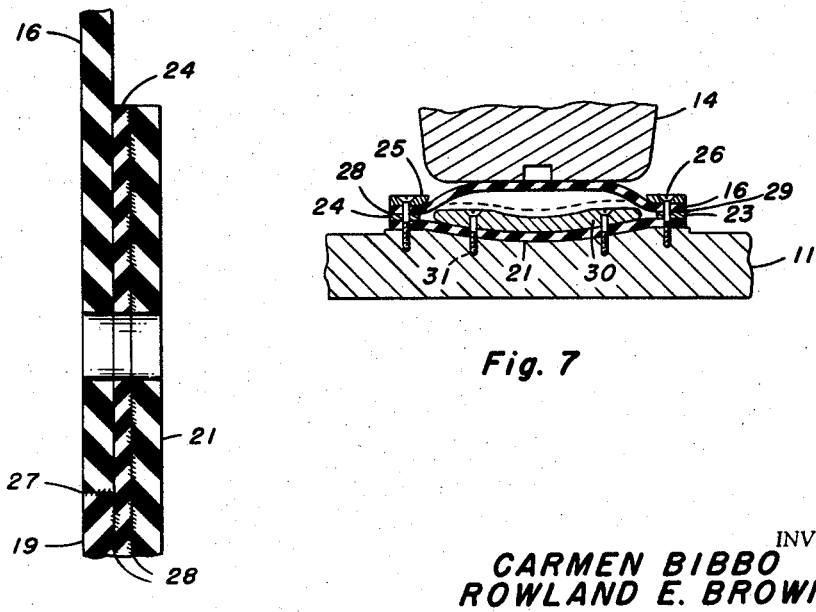
Fig. 7 is a sectional view taken along line 7—7 of Fig. 2.

A bore 32 is formed in casing 11 and communicates with groove 15. Exteriorly bore 32 threadedly receives a fitting 33 which in turn receives a conduit 34. Conduit 34 may be connected to a source of fluid under pressure (not shown) whereby the seal 17 is inflated. Seal 17 may be deflated by releasing the pressurized fluid therefrom and, if desired, negative pressure may be applied to completely withdraw the ply 16 into groove 15 and to completely deflate portion 18 as shown by the dotted lines of Figs. 3 and 7 and by full lines in Fig. 6. It will thus be seen that under such condition the flow of fluid through valve 10 will be offered a minimum of restriction by the seal 17 when the valve is open.

It is also to be understood that a second bore similar to bore 32 may be provided in casing 11 and communicating with groove 15 whereby cooling fluid may be circulated through seal 17 to prevent damage to the seal where fluids having high heat are passed through the valve.

In operation with the seal deflated and vane 14 in open position, it is desired to close the valve. Vane 14 is rotated to the closed position and seal 17 is inflated bringing plies 16 and 19 into engagement with the periphery of vane 14 and completely sealing the clearance space between vane 14 and the inside surface of casing 11. When it is desired to open the valve, seal 17 is deflated withdrawing plies 16 and 19 from engagement with the periphery of vane 14, whereby vane 14 may be rotated to the open position thereof without resistance of the seal.

An important feature of the structure of the present invention is that the seal may be removed for repair or replacement without removing vane 14 or shaft 13 from the valve casing 11.

It is also to be noted that flow of fluid through the valve is preferably in the direction indicated by arrow A thus placing U-shaped portion 18 on the upstream side of shaft 13 thus preventing leakage around the shaft when the valve is in closed position.

Obviously many modifications and variations of the present invention are possible in the light of the above teachings. It is therefore to be understood that within the scope of the appended claim the invention may be practiced otherwise than as specifically described.

What is claimed is:

In a butterfly valve, including a casing, a pair of oppositely disposed bores in said casing, a shaft rotatably mounted within said bores, and a vane member rigidly connected to said shaft and rotatable to bring its outer periphery into and out of juxtaposition to the inner peripherial surface of said casing thereby to substantially restrain or allow fluid flow through said casing, the improvement comprising; a pair of continuous grooves formed within said inner peripherial surface of said casing and opening inwardly of said casing adjacent said vane member when said vane member is in said juxtaposition, said grooves having ends terminated adjacent said bores, single-ply flexible seal means secured to said casing adjacent said grooves and overlying the grooves in fluid tight relation thereto, a pair of U-shaped two-ply flexible seal means partially circumjacent said shaft on the upstream side thereof, corresponding plies of each of the two-ply seal means having ends connected to the casing in said grooves on the respective opposite sides of the shaft, the other remaining ply of each of the two-ply seal means having ends respectively interconnecting with said single-ply seal means whereby said ends of the plies of said two-ply seal means are in fluid tight communication with said groove and said single-ply seal means, the U-shaped plies of said two-ply seal means having an inner edge adjacent the shaft and an outer edge in spaced relation to said shaft, means for sealing together the plies of said two-ply seal means at their inner edge and means for securing the outer edge of said two-ply seal means together and to said casing, said single-ply and two-ply seal means forming a continuous seal between the outer periphery of said vane member and said inner peripherial surface of said casing, and fluid pressure means for inflating and deflating said continuous seal to effect engagement and disengagement of said continuous seal with said vane member when said vane member is in said juxtaposition.

References Cited in the file of this patent

UNITED STATES PATENTS

| | | |
|---|---|---|
| 1,813,126 | Sheppard | July 7, 1931 |
| 1,834,870 | Rogers | Dec. 1, 1931 |
| 1,990,309 | Phillips | Feb. 5, 1935 |
| 2,705,016 | Saar | Mar. 29, 1955 |
| 2,840,338 | Shaw | June 24, 1958 |